United States Patent [19]

Towner et al.

[11] 3,870,217

[45] Mar. 11, 1975

[54] DATA RECORDERS

[75] Inventors: Frank Richard Towner, Wokingham; John Robert Snook, Great Hollands, both of England

[73] Assignee: Sperry Rand Limited, London, England

[22] Filed: Sept. 10, 1973

[21] Appl. No.: 396,029

[30] Foreign Application Priority Data

Sept. 29, 1972 Great Britain .................... 45021/72

[52] U.S. Cl. ..................... 226/188, 226/37, 226/178

[51] Int. Cl. ............................................ B65h 17/22

[58] Field of Search ................ 226/51, 178, 188, 37

[56] References Cited

UNITED STATES PATENTS

| | | | |
|---|---|---|---|
| 3,051,406 | 8/1962 | Wehde | 226/51 X |
| 3,124,291 | 3/1964 | Beer | 226/178 |
| 3,270,935 | 9/1966 | Selsted | 226/178 UX |
| 3,666,153 | 5/1972 | Stahl | 226/178 |
| 3,684,147 | 8/1972 | Ysbrand | 226/178 |

*Primary Examiner*—Richard A. Schacher

*Attorney, Agent, or Firm*—Howard P. Terry

[57] ABSTRACT

A data recorder comprises a tape deck having a recording medium in the form of a tape which is drivable by first drive means, in a recording mode, at one speed and drivable by second drive means, in a replay mode, at a different speed, the first and second drive means being operable to drive the tape through common drive elements and the arrangement being such that when the second drive means is in a driving position relative to the tape deck, the first drive means automatically is disconnected from the common drive elements, and when the second drive means is removed from its driving position, the first drive means automatically is reconnected to the common drive elements.

8 Claims, 2 Drawing Figures

DATA RECORDERS

BACKGROUND OF THE INVENTION

1. Field of the Invention

This invention relates to data recorders and more particularly, although not exclusively, to flight data acquisition recorders.

2. Summary of the Invention

According to the present invention a data recorder comprises a tape deck having a recording medium in the form of a tape which is drivable by first drive means, in a recording mode, at one speed and drivable by second drive means, in a replay mode, at a different speed, the first and second drive means being operable to drive the tape through common drive elements and the arrangement being such that when the second drive means is in a driving position relative to the tape deck, the first drive means automatically is disconnected from the common drive elements, and when the second drive means is removed from its driving position, the first drive means automatically is reconnected to the common drive elements.

Preferably the first drive means is connected to and disconnected from the common drive elements by relative movement between the first and second drive means such as to disconnect and connect, respectively, the second drive means from and to the common drive elements. In this case, the first drive means may drive one of the common drive elements through movable means biassed into an operative position and movable by the second drive means into an inoperative position. The movable means may be in the form of a spring-loaded ball which in the operative position connects said one common drive element to the first drive means, and in the inoperative position disengages said one common drive element from the first drive means. The first drive means may be a motor with an output shaft and said one common drive element may be a pulley mounted on the output shaft by one or more ball races and carrying the spring-loaded ball, the output shaft being provided with a member having a recess into which the ball projects in the operative position of the latter.

A flight data acquisition recorder system embodying the invention will now be described, in greater detail, by way of example, with reference to the accompanying drawings, in which:

DESCRIPTION OF THE PREFERRED EMBODIMENT

Figure 1:
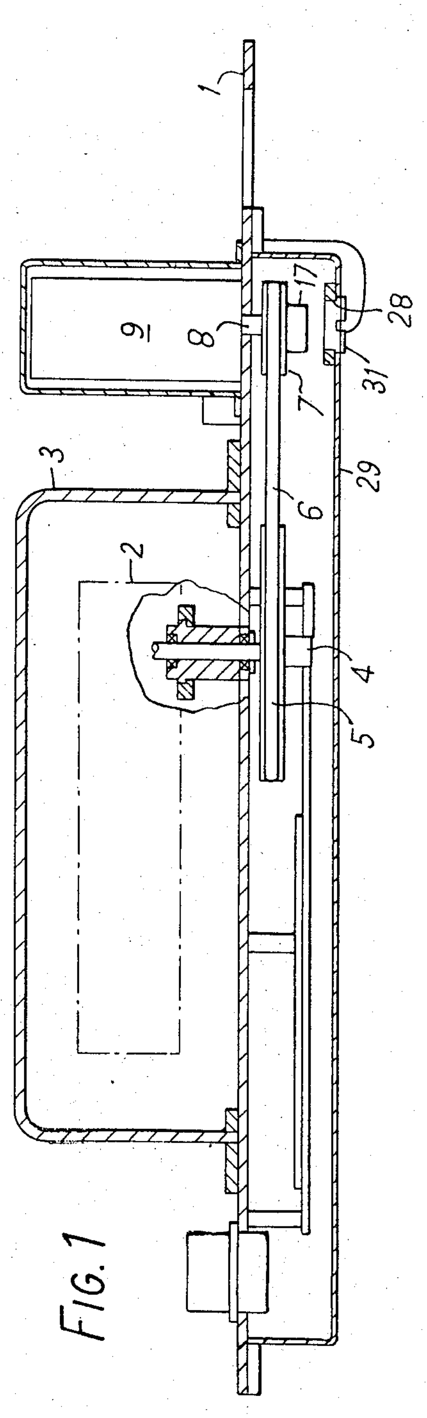
FIG. 1 is a cross-sectional view of the recorder part of the system.
Figure 2:
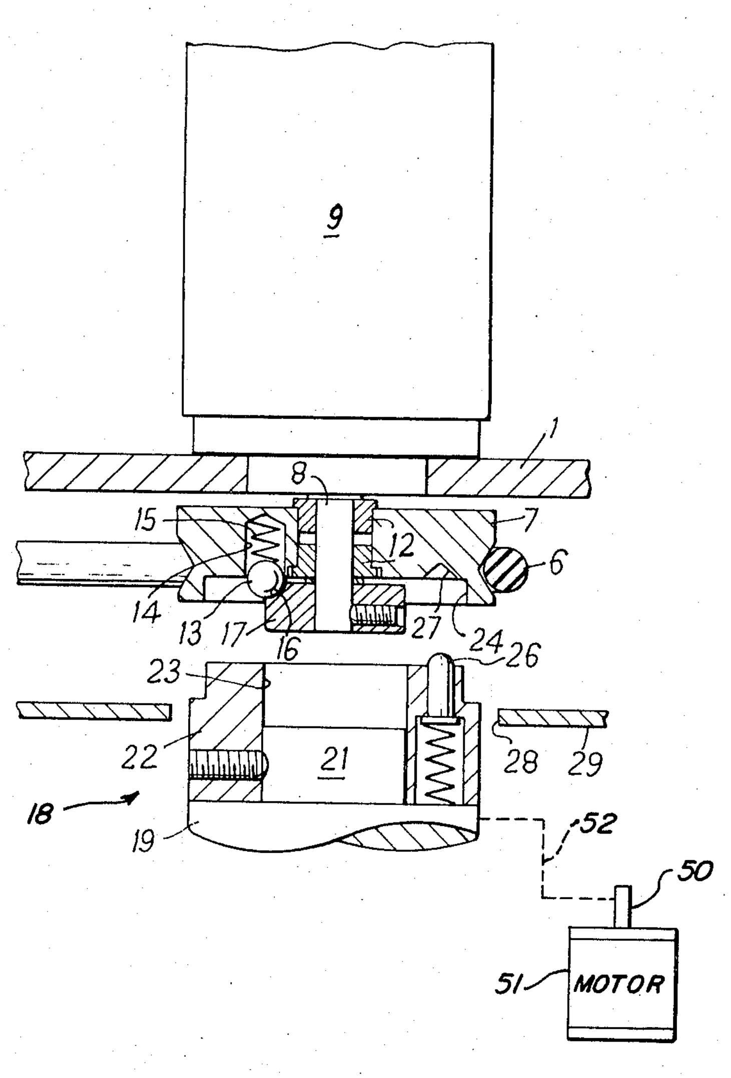
FIG. 2 is a detail, to a larger scale, of FIG. 1, showing also a detail of another part of the system.

The recorder system overall comprises the recorder shown in FIG. 1, associated electronics (not shown) and a replay unit, part only of which is shown in FIG. 2. Referring to FIG. 1, the recorder in the main is only shown in outline as the details thereof are not pertinent to the present invention. The recorder has a main support plate 1 extending across the entire unit and supporting a tape deck mounted within a protective casing indicated at 2, the latter being in turn mounted within an outer protective casing 3.

The recording tape (not shown) is driven by a conventional capstan of which only a shaft 4 thereof is shown. The shaft 4 extends through the support plate 1 and carries towards its outer end a flywheel 5 which is driven by a belt 6 from a pulley 7 connected to one end of an output shaft 8 of an electric motor 9. The motor 9 is mounted on the support plate 1 and the output shaft 8 extends therethrough. A further flywheel (not shown) is rotatably mounted on the support plate 1 in such a position adjacent the flywheel 5 that it is also driven by the belt 6, the two flywheels being on opposite sides of the belt whereby they are rotated in opposite directions.

Referring now more particularly to FIG. 2, the pulley 7 is carried on the motor output shaft 8 by two ball races 12 so that in order for the pulley to be driven by the shaft a connection has to be established therebetween. Such a driving connection is provided by a movable member in the form of a ball 13 which is a sliding fit in a blind bore 14 in the pulley, a spring 15 acting between the bottom of the bore and the ball serving to urge the latter into engagement with a recess 16 provided in a disc 17 keyed to the output shaft 8. Thus with the disc 17 fixed in position on the shaft 8, there is a positive drive connection between the shaft and the pulley 7 through the ball 13, and the motor 9 thus drives the pulley, and hence the recording tape, at one speed in a recording mode of the recorder, i.e., the normal operating mode of the recorder when in use in the aircraft in which the recorder system is fitted.

It is normally desirable to provide a replay facility which is capable of driving the recording tape at a speed greater than that at which the tape is driven in the recording mode in order to obtain fast replay and/or fast access to a particular portion of a track on the tape. Accordingly, it is necessary to disconnect the motor 9 from the pulley 7 when the faster drive is applied from the replay unit otherwise damage to the motor may result. To this end, the output shaft 50 of an electric replay drive motor 51 is connected indirectly at 52 to an attachment indicated generally at 18 in FIG. 2. The attachment comprises a shaft 19 formed with an axial projection 21 to which is keyed a sleeve 22 extending beyond the projection. The bore 23 of the sleeve 22 is such that the sleeve is a free sliding fit over the disc 17 attached to shaft 8, and the outer end is of a reduced diameter so as to fit within a recess 24 provided in the pulley 7. A spring-loaded plunger 26 is provided in the sleeve 22, the end of the plunger extending beyond the sleeve and being releasably engageable with a correspondingly shaped recess 27 in the pulley 7.

The attachment 18 is insertable through an aperture 28 in a cover 29 for the recorder drive means for engagement with the pulley 7. A removable plug 31 is provided for the aperture 28.

In normal operation of the recorder, i.e., in the recording mode, the tape is driven by the motor 9 through the capstan and this drive is stabilised by the provision of the contra-rotating flywheels referred to. When it is required to adopt the replay mode, the recorder is inserted into the replay unit whereupon the drive attachment 18 extends through the aperture 28 in the cover 29, the plug 31 having first been removed, and engages the pulley 7 and disc 17. As the sleeve 22 of the attachment 18 slides over the disc 17, the outer end engages the ball 13 and moves it, against the action of the spring 15, into the bore 14 to the extent that it disengages the recess 16 in the disc 17, whereby the motor 9 automatically is disconnected from the pulley 7 which is still free to rotate on the shaft 8 by virtue of the ball races 12. At the same time, the plunger 26 engages the recess 27 to establish a positive drive connection between the replay drive means and the pulley 7 for driving the tapes at the required speed, when desired. Should the plunger 26 and recess 27 not be aligned in the first instance, it is merely necessary to effect relative rotation between the pulley 7 and the attachment 18 to achieve alignment and engagement. As the plunger 26 is spring loaded, it is biassed into engagement with the recess 27, thereby preventing any inadvertent disengagement.

When the recorder is removed from the replay unit, or when the replay drive means is withdrawn, it will be noted that the drive connection between the pulley 7 and the motor 9 automatically is re-established. This is because as the sleeve 22 slides off the disc 17, the spring 15 urges the ball 13 out of the bore 14 into engagement again, assuming alignment, with the recess 16 in the disc 17. If there is misalignment between the ball 13 and the recess 16, again it is a simple matter to achieve alignment by effecting relative rotation between the pulley 7 and the disc 17.

It will be seen that the motor 9 and the drive means of the replay unit each drive the recording tape through common drive elements in the form of the capstan, the flywheel 5, and the pulley 7. Thus a simple tape drive is provided, together with a simple changeover from one drive to the other whilst ensuring that both in the recording mode and the replay mode the drive is positive.

We claim:

1. A data recorder comprising a tape deck having a recording medium in the form of a tape which is drivable by first drive means, in a recording mode, at one speed and drivable by second drive means, in a replay mode, at a different speed, the first and second drive means being operable to drive the tape through common drive elements and the arrangement being such that when the second drive means is in a driving position relative to the tape deck, the first drive means automatically is disconnected from the common drive elements, and when the second drive means is removed from its driving position, the first drive means automatically is reconnected to the common drive elements, wherein the first drive means is connected to and disconnected from the common drive elements by relative movement between the first and second drive means such as to disconnect and connect, respectively, the second drive means from and to the common drive elements, wherein the first drive means is operable to drive one of the common drive elements through movable means biased into an operative position and movable by the second drive means into an inoperative position, wherein the movable means is a spring-loaded ball which in the operative position connects said one common drive element to the first drive means and in the inoperative position disengages said one common drive element from the first drive means, wherein the first drive means is a motor having an output shaft, and said one common drive element is a pulley mounted on said output shaft by a ball race and carrying the spring-loaded ball, the output shaft being provided with a member having a recess into which the ball projects in its operative position, wherein the second drive means is a motor having an output shaft to which is connected an attachment comprising a shaft, a sleeve keyed to the latter, and a plunger carried by the sleeve and releasably engageable with a recess in the pulley to provide a drive connection between the second drive means and the pulley.

2. A recorder according to claim 1, wherein the plunger is spring loaded so as to be biassed into engagement with said recess in the pulley.

3. A data recorder comprising tape deck means having a recording medium in the form of a tape, common drive means for driving said tape, a first motor mounted on said tape deck means for driving said tape at a first speed through said common drive means in a recording mode, second motor means for driving said tape at a speed different from said first speed through said common drive means in a replay mode, said second motor means being positionable into a driving position relative to said tape deck means and normally retractable from said driving position, and selectively positionable coupling means in said common drive means positionable into a connecting position for providing a driving connection between said first motor and said common drive means and positionable into a disconnecting position for entirely disengaging any driving connection between said common drive means and said first motor at all speeds of said first motor and second motor means, said second motor means including a second motor and attachment means coupled thereto for positioning said positionable coupling means into said disconnecting position when said second motor means is in said driving position relative to said tape deck means, said positionable coupling means automatically returning to said connecting position when said second motor means is retracted from said driving position.

4. The recorder of claim 3 in which said common drive means includes biasing means for urging said positionable coupling means into said connecting position, thereby causing said positionable coupling means to automatically return to said connecting position when said second motor means is retracted from said driving position, said attachment means moving said positionable coupling means against said biasing means into said disconnecting position when said second motor means is positioned into said driving position relative to said tape deck means.

5. The recorder of claim 4 in which said selectively positionable coupling means comprises a spring loaded ball and wherein said biasing means comprises a spring urging said ball into said connecting position.

6. The recorder of claim 5 in which said first motor includes an output shaft and said common drive means comprises a pulley mounted on said output shaft by a ball race and carrying said spring loaded ball, said output shaft being provided with a member having a recess into which said ball projects in its connecting position, said attachment means including means for moving said ball out of said recess against said spring and into said disconnecting position when said second motor means is positioned into said driving position relative to said tape deck means.

7. The recorder of claim 6 in which said second motor includes an output shaft to which said attachment means is connected, and said attachment means comprises a shaft, a sleeve keyed to said shaft and a plunger carried by said sleeve and releasably engageable with a recess in said pulley to provide a drive connection between said second motor and said pulley.

8. The recorder of claim 7 in which said plunger is spring loaded so as to be biased into engagement with said recess in said pulley.

* * * * *